United States Patent
Cascaval et al.

(10) Patent No.: US 8,136,103 B2
(45) Date of Patent: *Mar. 13, 2012

(54) COMBINING STATIC AND DYNAMIC COMPILATION TO REMOVE DELINQUENT LOADS

(75) Inventors: Gheorghe C. Cascaval, Carmel, NY (US); Yaoqing Gao, North York (CA); Allan H. Kielstra, Ajax (CA); Kevin A. Stoodley, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1002 days.

This patent is subject to a terminal disclaimer.

(21) Appl. No.: 12/058,172

(22) Filed: Mar. 28, 2008

(65) Prior Publication Data

US 2009/0249316 A1    Oct. 1, 2009

(51) Int. Cl.
*G06F 9/45* (2006.01)

(52) U.S. Cl. ........ 717/145; 717/140; 717/146; 717/148; 717/130; 717/131

(58) Field of Classification Search ........................ None
See application file for complete search history.

(56) References Cited

U.S. PATENT DOCUMENTS

| | | | |
|---|---|---|---|
| 5,752,014 A | 5/1998 | Mallick et al. | |
| 6,115,809 A | 9/2000 | Mattson, Jr. et al. | |
| 6,622,300 B1 * | 9/2003 | Krishnaswamy et al. | 717/130 |
| 6,941,257 B2 * | 9/2005 | Roesner et al. | 703/15 |
| 6,959,435 B2 * | 10/2005 | Ju et al. | 717/158 |
| 6,966,057 B2 * | 11/2005 | Lueh | 717/158 |
| 6,968,546 B2 * | 11/2005 | Lueh | 717/158 |
| 7,158,924 B2 * | 1/2007 | Williams et al. | 703/17 |
| 7,577,947 B2 * | 8/2009 | Subramoney et al. | 717/151 |
| 7,730,470 B2 * | 6/2010 | Sharapov et al. | 717/151 |
| 7,844,801 B2 * | 11/2010 | Wang et al. | 712/225 |
| 7,954,094 B2 * | 5/2011 | Cascaval et al. | 717/145 |
| 2002/0144245 A1 * | 10/2002 | Lueh | 717/140 |
| 2003/0126590 A1 * | 7/2003 | Burrows et al. | 717/154 |
| 2003/0145314 A1 * | 7/2003 | Nguyen et al. | 717/158 |
| 2004/0054990 A1 | 3/2004 | Liao et al. | |
| 2004/0158825 A1 * | 8/2004 | Kim | 717/148 |
| 2005/0027941 A1 * | 2/2005 | Wang et al. | 711/121 |
| 2005/0086653 A1 * | 4/2005 | Heishi et al. | 717/151 |

(Continued)

OTHER PUBLICATIONS

Title: Static identification of delinquent loads, author: Panait, V.-M et al, source: IEEE, dated: Mar. 20, 2004.*

(Continued)

*Primary Examiner* — Chameli Das
(74) *Attorney, Agent, or Firm* — Steven M. Greenberg, Esq.; Carey, Rodriguez, Greenberg & O'Keefe

(57) ABSTRACT

A method for combined static and dynamic compilation of program code to remove delinquent loads can include statically compiling source code into executable code with instrumented sections each being suspected of including a delinquent load, and also into a separate intermediate language representation with annotated portions each corresponding to one of the instrumented sections. The method also can include executing the instrumented sections repeatedly and monitoring cache misses for each execution. Finally, the method can include dynamically recompiling selected ones of the instrumented sections using corresponding ones of the annotated portions of the separate intermediate language representation only after a threshold number of executions of the selected ones of the instrumented sections, each recompilation include a pre-fetch directive at a pre-fetch distances tuned to avoid the delinquent load.

13 Claims, 2 Drawing Sheets

U.S. PATENT DOCUMENTS

| | | | |
|---|---|---|---|
| 2005/0138329 A1* | 6/2005 | Subramoney et al. | 712/207 |
| 2006/0048120 A1* | 3/2006 | Archambault et al. | 717/160 |
| 2007/0226703 A1* | 9/2007 | Sharapov et al. | 717/131 |
| 2008/0163180 A1* | 7/2008 | Havin et al. | 717/130 |

OTHER PUBLICATIONS

Title: Load redundancy removal through instruction reuse author: Jun Yang et al, source: IEEE, dated:Aug. 6, 2002.*

Zhang, Weifeng, et al.; "A Self-Repairing Prefetcher in an Event-Driven Dynamic Optimization Framework"; International Symposium on Code Generation and Optimization; Mar. 2006.

Panait, Vlad-Mihai, et al.; "Static Identification of Delinquent Loads"; International Symposium on Code Generation and Optimization; 2004.

Nanri, Takeshi, et al.; "Using Cache Optimizing Compiler for Managing Software Cache on Distributed Shared Memory System"; IEEE; 1997.

Lu, Jiwei, et al.; "Design and Implementation of a Lightweight Dynamic Optimization System"; Journal of Instruction-Level Parallelism 6; pp. 1-24; 2004.

* cited by examiner

COMBINING STATIC AND DYNAMIC COMPILATION TO REMOVE DELINQUENT LOADS

BACKGROUND OF THE INVENTION

1. Field of the Invention

The present invention relates to the field of memory caching and more particularly to the field of load and store instructions management during program code compilation, optimization and execution.

2. Description of the Related Art

Memory cache technologies have formed an integral part of computer engineering and computer science for well over two decades. Initially embodied as part of the underlying hardware architecture of a data processing system, data caches and program instruction caches store often-accessed data and program instructions in fast memory for subsequent retrieval in lieu of retrieving the same data and instructions from slower memory stores. Consequently, substantial performance advantages have been obtained through the routine incorporation of cache technologies in computer main board designs.

Data and instruction caches are hardware structures, that traditionally transparent to software (i.e., the hardware manages them without software intervention or knowledge). Data caching technologies have become particularly important in the context of program code compilation and optimization. Compiler technology can be used to generate instructions that provide cache management hints, such as pre-fetching, or generate code that has memory access patterns which favor cache reuse. In program code compilation and optimization, program code can be tooled to encourage processor caching of required data so as to avoid persistent retrieval of data from main memory.

In this regard, the effective use of a processor cache can be crucial to the performance of an application. To with, it has been shown that cache misses are not evenly distributed throughout a program. In fact, academically, it has been shown that a small number of load instructions are responsible for most cache misses in an application, called delinquent loads in the rest of the description. A "delinquent load" is a load instruction whose execution consistently results in a cache miss. Identification of delinquent loads therefore, can be essential to the success of many cache optimization and pre-fetching techniques.

There are a number of compilation techniques used to statically analyze program sections and discover load instructions which have a high probability of resulting in cache misses. Once identified, there are steps that the compiler can take to pre-fetch the memory locations into the cache and thus ameliorate the dilatory effects of these instructions.

Pre-fetching is a technique used to hide the latency of a cache miss by making a memory reference far in advance of when that data is required. Pre-fetching consists of providing a hint to the processor that a datum at a specific address will be needed in the very near future. Inserting a pre-fetch instruction requires two attributes: the data address of the datum needed and how far in advance to insert, such that the data is in the cache when it is needed. Pre-fetching is most often done in loops because it is easier to predict that a data element will be required in the future. How far in advance a microprocessor must fetch or "pre-fetch" is determined by the stride distance (S), the latency (L) between main memory and the cache, the loop iteration time (T), and the cache line size (N). According to S, L, T and N, a pre-fetch distance (P) can be computed as $P=S(L/T)/N$ where L and T are measured in cycles, N is expressed in terms of the number of data elements in the cache line, and P is expressed in units of cache line size. Thus, as the latency increases, the compiler will have to fetch farther in advance to allow sufficient time for the element to be brought from main memory to the cache.

Despite the promise of pre-fetching, there can be delinquent load instructions for which any static analysis can only conclude that a load instruction has a consistent probability of failing to find its datum in the cache. In this circumstance, it is inadvisable to pre-fetch the memory locations into the cache since doing so can result in performance degradation due to either cache pollution, or excess memory bandwidth consumption without the pre-fetching being successful. Furthermore, there are cases where a static analysis can determine that a load instruction is delinquent but cannot determine how far in advance data should be pre-fetched in order to satisfy the load in time.

BRIEF SUMMARY OF THE INVENTION

Embodiments of the present invention address deficiencies of the art with respect to delinquent load handling during program code optimization and provide a novel and non-obvious method, system and computer program product for combined static and dynamic compilation of program code to remove delinquent loads. In an embodiment of the invention, a method for combined static and dynamic compilation of program code to remove delinquent loads can be provided.

The method can include statically compiling source code into executable code with instrumented sections each being suspected of including a delinquent load, and also into a separate intermediate language representation with annotated portions each corresponding to one of the instrumented sections.

The method also can include executing the instrumented sections repeatedly and monitoring cache misses for each execution. Finally, the method can include dynamically recompiling selected ones of the instrumented sections using corresponding ones of the annotated portions of the separate intermediate language representation only after a threshold number of executions of the selected ones of the instrumented sections, each recompilation include a pre-fetch directive at a pre-fetch distances tuned to avoid the delinquent load. Additionally, the method can include removing instrumentation from the selected ones of the instrumented sections during recompilation. Optionally, the method yet further can include batch processing the dynamic recompilation of the instrumented sections.

In another embodiment of the invention, a code optimization data processing system can be configured for combined static and dynamic compilation of program code to remove delinquent loads. The system can include a static compiler configured to statically compile source code into executable code with instrumented sections each being suspected of including a delinquent load, and also into a separate intermediate language representation with annotated portions each corresponding to one of the instrumented sections. The system further can include a managed run-time including both a monitor and a dynamic compiler.

The monitor can include program code enabled to monitor cache misses for the instrumented sections during execution of instrumented sections. The dynamic compiler in turn can include program code enabled to dynamically recompile selected ones of the instrumented sections using corresponding ones of the annotated portions of the separate intermediate language representation only after a threshold number of executions of the selected ones of the instrumented sections, each recompilation include a pre-fetch directive at a pre-fetch distances tuned to avoid the delinquent load. In one aspect of the embodiment, the instrumented sections being suspected of including a delinquent load can include loop constructs with loads of predictable future values loaded in subsequent iterations. In another aspect of the embodiment, the instrumented sections being suspected of including a delinquent load can encapsulate respective induction variables for the loop constructs, compiling source code and annotating the compiled source code at portions suspected to include a delinquent load.

The method further can include instrumenting the compiled source code at the annotated portions to determine a number of cache misses experienced from executing respective loads. The method yet further can include executing the instrumented compiled source code and measuring cache misses for loads at the instrumented annotated portions. Finally, the method can include optimizing the compiled source code by inserting a pre-fetch directive only for loads demonstrating a threshold number of cache misses during execution.

In one aspect of the embodiment, annotating the compiled source code at portions suspected to include a delinquent load can include annotating the compiled source code at loop constructs with loads of predictable future values loaded in subsequent iterations. For example, annotating the compiled source code at portions suspected to include a delinquent load can include annotating the loads at loop constructs with intermediate language directives encapsulating respective induction variables for the loop constructs.

In another aspect of the embodiment, optimizing the compiled source code by inserting a pre-fetch directive only for loads demonstrating a threshold number of cache misses during execution further can include estimating a pre-fetch distance in response to determining that an annotated portion of the compiled source code is a known delinquent load with an undetermined pre-fetch distance for a remedial pre-fetch directive, and optimizing the compiled source code by inserting a pre-fetch directive at the estimated pre-fetch distance for the known delinquent load. Finally, in yet a further aspect of the embodiment, the method additionally can include detecting a high rate of cache misses for a delinquent load and tuning a pre-fetch distance for a pre-fetch directive associated with the delinquent load in response to detecting a high rate of cache misses for the delinquent load.

In another embodiment of the invention, a code optimization data processing system can be configured for combined static and dynamic compilation of program code to remove delinquent loads. The system can include a static compiler coupled to an annotator configured to annotate source code compiled by the static compiler at portions suspected to include a delinquent load. The system also can include a managed run-time coupled both to instrumentation logic and optimization logic.

The instrumentation logic can include program code enabled to instrument the compiled source code at the annotated portions to determine a number of cache misses experienced from executing respective loads. The optimization logic, in turn, can include program code enabled to execute the instrumented compiled source code, to measure cache misses for loads at the instrumented annotated portions, and to optimize the compiled source code by inserting a pre-fetch directive only for loads demonstrating a threshold number of cache misses during execution.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for combined static and dynamic compilation of program code to remove delinquent loads. In accordance with an embodiment of the present invention, source code can be statically compiled into executable code with instrumentation configured to detect probable delinquent loads. An intermediate representation of the executable code also can be generated to include annotated portions corresponding to instrumented sections of the executable code. Subsequently, the executed code can be repeatedly executed.

At each execution of each instrumented section of the executable code, a monitor can collect performance metrics, and when an instrumented section of the executable code has executed a sufficient number of times, the performance metrics for the section can be used to tune the instrumented section of the executable code. In this regard, a pre-fetch distance can be estimated for the instrumented section of the executable code in order to remediate a delinquent load apparent in the section. Thereafter, a pre-fetch directive with the estimated pre-fetch distance can be inserted into an annotated portion of the intermediate code corresponding to the section and the section can be dynamically recompiled without instrumentation. The execution cycles of the different instrumented sections of the executable code can continue until no instrumented sections remain producing optimized code.

Figure 1:
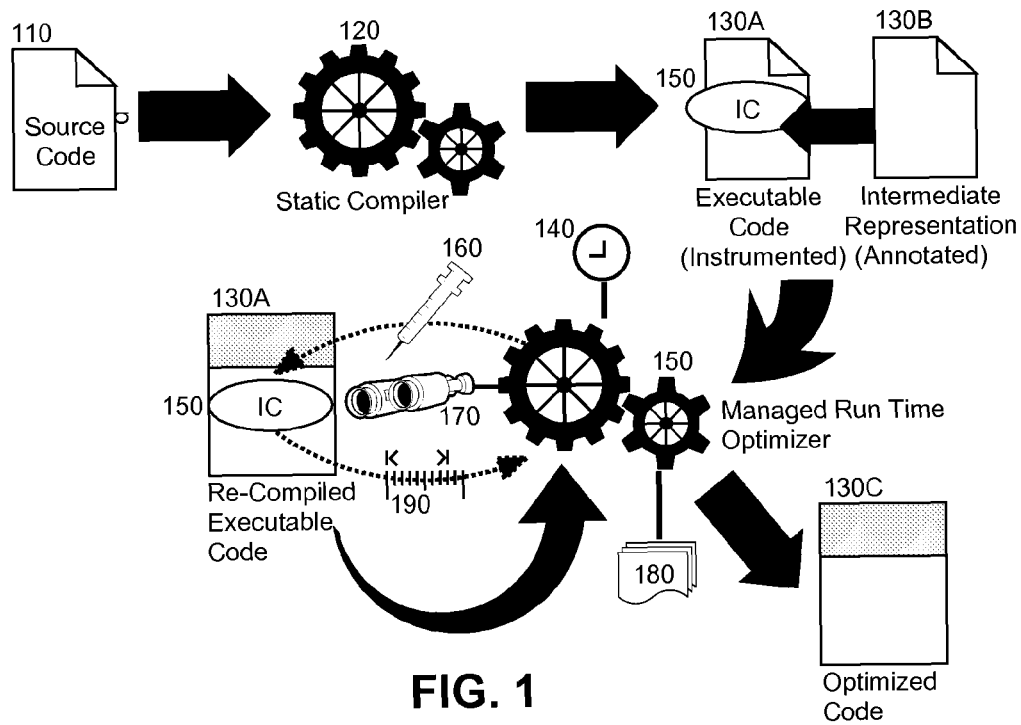
FIG. 1 is a pictorial illustration of a process for combined static and dynamic compilation of program code to remove delinquent loads.

In illustration, FIG. 1 pictorially depicts a process for combined static and dynamic compilation of program code to remove delinquent loads. In a process consistent with an embodiment of the invention, source code 110 can be processed in a static compiler 120 to produce executable code 130A and corresponding intermediate representation 130B of the executable code 130A. The executable code 130A can include different instrumented code sections 150, each of the instrumented code sections 150 reflecting a probable delinquent load. In particular, each of the instrumented code sections 150 can include instrumentation to monitor the execution of load instructions and surrounding code likely to result in a delinquent load, or to monitor load instructions known to be delinquent loads in which a pre-fetch distance is not statically known.

Specifically, profiling directives can be injected in proximity to the suspected delinquent loads to measure whether or not the suspected delinquent loads when executed result in a cache miss during execution. The corresponding intermediate representation 130B can include different annotations each referencing one of the instrumented code sections 150 and providing sufficient data to effectuate a dynamic recompilation of a referenced one of the instrumented code sections 150 In this regard, a run-time optimizer 150 can be provided to execute the executable code 130A and to provide dynamic recompilation of selected ones of the instrumented code sections 150.

More particularly, during execution, a monitoring component 170 of the run-time optimizer 150 can track cache miss data 180 for the instrumented executable code 130A. A counter 140 further can count a number of executions of different ones of the instrumented code sections 150. When a sufficient number of executions of a monitored one of the instrumented code sections 150 have occurred, a pre-fetch distance 190 can be computed to optimize the monitored one of the instrumented code sections 150. Thereafter, the monitored one of the instrumented code sections 150 can be dynamically compiled utilizing an associated annotated portion of the intermediate representation 130B to produce recompiled code 160 for insertion into the executable code 130A in place of the monitored one of the instrumented code sections 150. Optionally, the instrumentation for the monitored one of the instrumented code sections 150 can be included in the recompiled code 160 to allow continued monitoring, or the instrumentation can be removed. When enough if not all of the instrumented code sections 150 have been replaced with recompiled code 160 providing for optimal pre-fetch distances 190, optimized code 130C without instrumentation can result.

Figure 2:
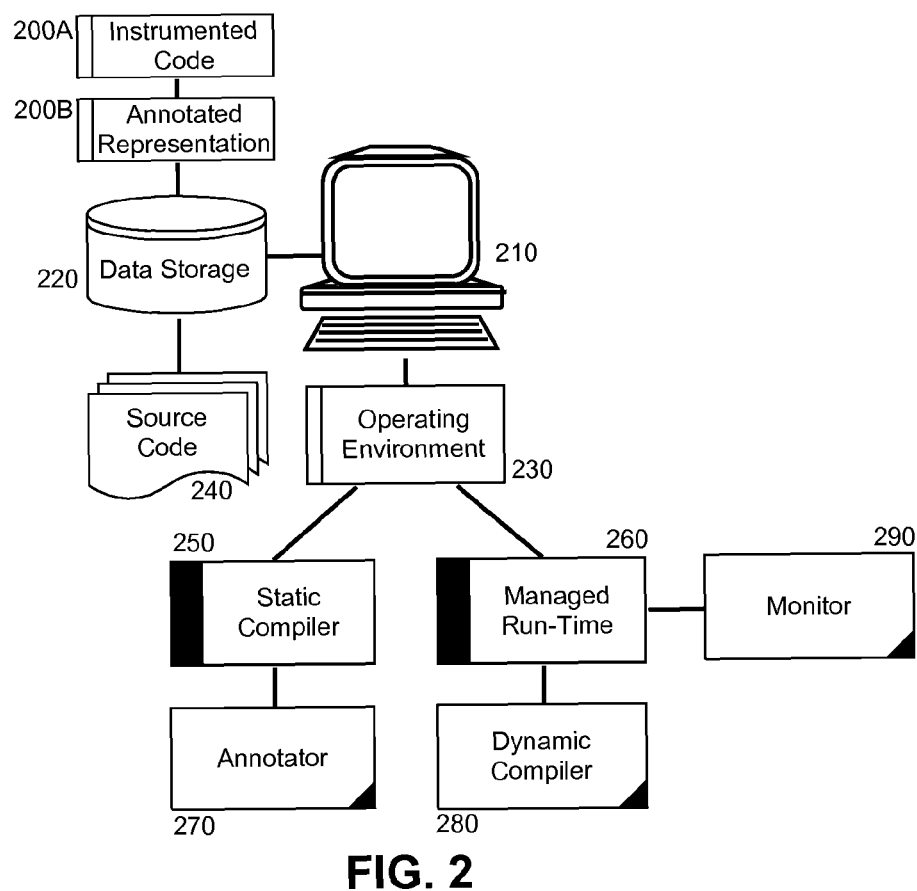
FIG. 2 is a schematic illustration of a program code compilation and optimization data processing system configured for combined static and dynamic compilation of program code to remove delinquent loads; and, FIG. 3 is a flow chart illustrating a process for optimizing instrumented code with pre-fetch directives with tuned pre-fetch distances.

In yet further illustration, FIG. 2 is a schematic illustration of a program code compilation and optimization data processing system configured for combined static and dynamic compilation of program code to remove delinquent loads. As shown in FIG. 2, a host computing platform 210 coupled to data storage 220 can support the operation of an operating environment 230 such as an operating system or a virtual machine (or both). Executing within the operating environment 230, a static compiler 250 can be configured to compile source code 240 into instrumented executable code 200A. The instrumented executable code 200A can include instrumented sections containing probable delinquent loads, the instrumentation producing run-time data reflecting cache misses produced by the probable delinquent loads.

The static compiler 250 also can be configured to produce a companion intermediate language representation 200B of the instrumented executable code 200A. The intermediate language representation 200B can include different annotations applied by annotator 270 denoting suspected delinquent loads or delinquent loads with unknown pre-fetch distances, each annotated portion relating to a corresponding instrumented section of the instrumented executable code 200A. More particularly, the annotator 270 can include program code executed during compilation of the source code 240 to annotate portions of the intermediate language representation 200B determined to be probable delinquent loads. A delinquent load is likely where the values to be loaded in a looping construct are readily predictable from iteration to iteration. Examples include traversing a linked list through an iterative loop. Therefore, the loads of interest are those which load values from addresses which are computed by an expression based on a loop induction variable.

Also executing within the operating environment 230, a managed run-time 260 can be configured to execute the instrumented executable code 200A. The managed run-time 260 can be coupled to both a dynamic compiler 280 and a monitor 290. The monitor 290 can be configured to monitor the execution of the instrumented sections of the instrumented executable code 200A. The dynamic compiler 280, in turn, can be configured to recompile each instrumented section by reference to a related portion of the annotated representation 200B in order to inject a pre-fetch directive where appropriate for a delinquent load and to tune a pre-fetch distance for the pre-fetch directive in response to detecting a high rate of cache misses for a delinquent load.

Figure 3:
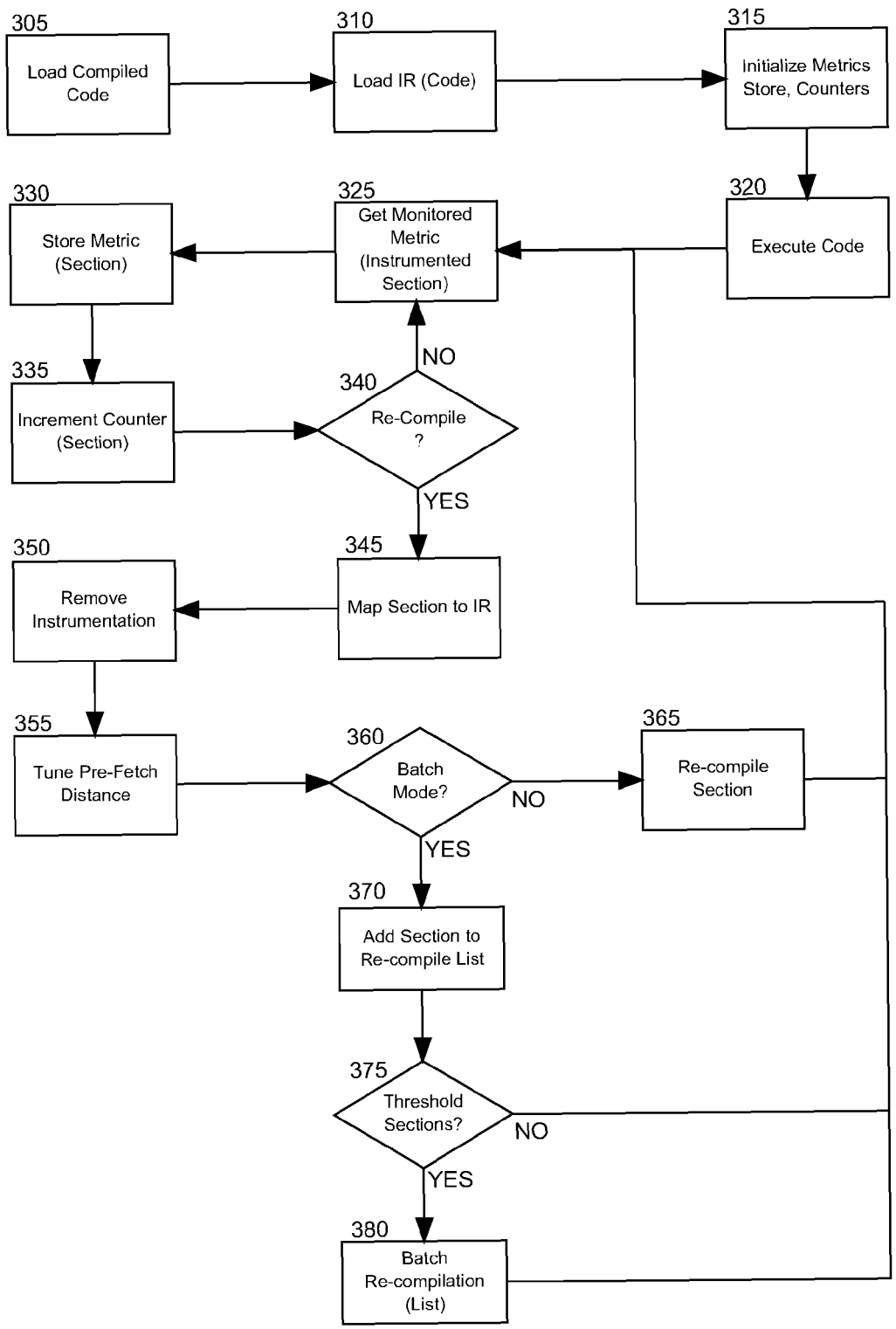

In even yet further illustration of the operation of the managed run-time 260, FIG. 3 illustrates a process for statically and dynamically compiling source code to remove delinquent loads. The process can begin in block 305 with the loading of instrumented executable code and also in block 310 with the loading of a companion intermediate language representation of the executable code. In block 315, memory elements for performance metrics and also different counters for each instrumented section of the instrumented executable code can be initialized and in block 320, the instrumented executable code can be executed.

In block 325, monitored metrics can be collected for an instrumented section of the instrumented executable section. The metrics can include, by way of example, an indication of whether or not a cache miss has occurred. Thereafter, in block 330 the metrics can be stored in connection with the instrumented section and in block 335 a counter can be incremented for the instrumented section corresponding to an execution cycle for the instrumented section. In consequence, in decision block 340 it can be determined whether enough iterations of execution have occurred for the instrumented section to merit tuning and recompilation of the program code of the instrumented section of the executable code. If not, in block 325 additional metrics can be received for other instrumented sections. Otherwise, the process can proceed through block 345.

In block 345, instrumented section can be mapped to an annotated portion of the intermediate language representation. Subsequently, in block 350 the instrumentation can be removed from the instrumented section and in block 355, a fetch distance from a probable delinquent load in the instrumented section can be estimated for placing a pre-fetch directive. In decision block 360, it can be determined whether to dynamically recompile the instrumented section at once, or whether to engage in the batch recompilation of multiple different instrumented sections due for recompilation. In the former circumstance, in block 365 the instrumented section can be recompiled with an injected pre-fetch directive. In the latter circumstance, in block 370 the instrumented section can be queued for batch dynamic recompilation. Subsequently, in decision block 375 it can be determined if enough instrumented sections have been queued for recompilation. If so, in block 380 the instrumented sections queued for batch recompilation can be dynamically recompiled, each with a pre-fetch directive injected into the recompiled instrumented section at a tuned pre-fetch distance.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for combined static and dynamic compilation of program code to remove delinquent loads, the method comprising:
    statically compiling source code into executable code with instrumented sections each being suspected of including a delinquent load, and also into a separate intermediate language representation with annotated portions each corresponding to one of the instrumented sections;
    executing the instrumented sections repeatedly and monitoring cache misses for each execution; and,
    dynamically recompiling selected ones of the instrumented sections using corresponding ones of the annotated portions of the separate intermediate language representation only after a threshold number of executions of the selected ones of the instrumented sections, each recompilation include a pre-fetch directive at a pre-fetch distances computed to avoid the delinquent load.

2. The method of claim 1, further comprising removing instrumentation from the selected ones of the instrumented sections during recompilation.

3. The method of claim 1, further comprising batch processing the dynamic recompilation of the instrumented sections.

4. The method of claim 1, wherein statically compiling source code into executable code with instrumented sections each being suspected of including a delinquent load comprises instrumenting sections of the executable code at loop constructs with loads of predictable future values loaded in subsequent iterations.

5. The method of claim 4, wherein statically compiling source code into executable code with instrumented sections each being suspected of including a delinquent load comprises instrumenting the sections of the executable code at the loads at loop constructs with intermediate language directives encapsulating respective induction variables for the loop constructs.

6. A code optimization data processing system configured for combined static and dynamic compilation of program code to remove delinquent loads, the system comprising:
    a static compiler executing in memory of a computer system and configured to statically compile source code into executable code with instrumented sections each being suspected of including a delinquent load, and also into a separate intermediate language representation with annotated portions each corresponding to one of the instrumented sections; and,
    a managed run-time also executing in the memory of the computer system and comprising both a monitor and a dynamic compiler, the monitor comprising program code enabled to monitor cache misses for the instrumented sections during execution of instrumented sections, the dynamic compiler comprising program code enabled to dynamically recompile selected ones of the instrumented sections using corresponding ones of the annotated portions of the separate intermediate language representation only after a threshold number of executions of the selected ones of the instrumented sections, each recompilation include a pre-fetch directive at a pre-fetch distances computed to avoid the delinquent load.

7. The system of claim 6, wherein the instrumented sections being suspected of including a delinquent load, comprises loop constructs with loads of predictable future values loaded in subsequent iterations.

8. The system of claim 7, instrumented sections being suspected of including a delinquent load encapsulate respective induction variables for the loop constructs.

9. A computer program product comprising a computer usable storage medium storing computer usable program code for combined static and dynamic compilation of program code to remove delinquent loads, the computer program product comprising:
    computer usable program code for statically compiling source code into executable code with instrumented sections each being suspected of including a delinquent load, and also into a separate intermediate language representation with annotated portions each corresponding to one of the instrumented sections;
    computer usable program code for executing the instrumented sections repeatedly and monitoring cache misses for each execution; and,
    computer usable program code for dynamically recompiling selected ones of the instrumented sections using corresponding ones of the annotated portions of the separate intermediate language representation only after a threshold number of executions of the selected ones of the instrumented sections, each recompilation include a pre-fetch directive at a pre-fetch distances computed to avoid the delinquent load.

10. The computer program product of claim 9, further comprising computer usable program code for removing instrumentation from the selected ones of the instrumented sections during recompilation.

11. The computer program product of claim 9, further comprising computer usable program code for batch processing the dynamic recompilation of the instrumented sections.

12. The computer program product of claim 9, wherein the computer usable program code for statically compiling source code into executable code with instrumented sections each being suspected of including a delinquent load comprises computer usable program code for instrumenting sections of the executable code at loop constructs with loads of predictable future values loaded in subsequent iterations.

13. The computer program product of claim 12, wherein the computer usable program code for statically compiling source code into executable code with instrumented sections each being suspected of including a delinquent load comprises computer usable program code for instrumenting the sections of the executable code at the loads at loop constructs with intermediate language directives encapsulating respective induction variables for the loop constructs.

* * * * *